United States Patent [19]
Connonrs

[11] Patent Number: 5,385,430
[45] Date of Patent: Jan. 31, 1995

[54] PIPELINE BALLASTING DEVICE

[76] Inventor: Geoff W. Connonrs, 146 Crystal Dr., Chatham, Ontario, Canada, N7M 3E1

[21] Appl. No.: 51,414

[22] Filed: Apr. 23, 1993

[51] Int. Cl.⁶ .............................................. F16L 1/028
[52] U.S. Cl. ..................... 405/157; 405/172
[58] Field of Search .............. 405/19, 32, 70, 154, 405/157, 172; 138/105

[56] References Cited

U.S. PATENT DOCUMENTS

| | | | |
|---|---|---|---|
| 3,640,073 | 2/1972 | Samsel | 405/70 |
| 3,779,027 | 12/1973 | Murphy | 405/172 |
| 3,793,845 | 2/1974 | Keith | 405/172 |
| 4,166,710 | 9/1979 | Spiridonov | 405/172 |
| 4,913,588 | 4/1990 | Vilnes | 405/157 |

Primary Examiner—David H. Corbin

[57] ABSTRACT

A conduit weighting device comprising containment device adapted to supportingly receive a superposed charge of ballast material, in contained relation within an at least one enclosure circumscribed on all sides by upwardly extending containment device walls adapted to retainingly confine the charge between the walls. The device is adapted to be positioned in straddling, superposed relation over a conduit, to thereby at least partly counter displacement forces effecting the conduit means.

11 Claims, 5 Drawing Sheets

PIPELINE BALLASTING DEVICE

FIELD OF THE INVENTION

The present invention relates to a pipeline weighting device. More particularly, the present invention relates to a device for countering post-installation buoyant displacement forces that may undesirably effect a pipeline emplacement, particularly in subterranean emplacements.

BACKGROUND OF THE INVENTION

Pipeline emplacements are often subject to various forces, such as hydrodynamic and hydrostatic forces, for example, which can manifest in the displacement of the pipeline from its originally installed position. Consequential pipeline rupture can have adverse environmental and financial repercussions.

Responsible pipeline companies and contractors are committed to installations whose designs provide for a high margin of design tolerance over and above any purely structural requirement for pipeline weighting. This abundance of caution is intended to offset the catastrophic potential attached to taking unwarranted risks that might lead to displacement and consequential pipeline damage, including service interruption, and environmental damage.

To that end, the traditional, and still predominating practice in the industry, entails weighting the pipeline with massive concrete weights. Earlier designs include clamp-on-weights of various descriptions, as well as the more typical large pre-cast concrete arch structures that are arranged in bridging relation over top of the pipeline. These latter mentioned designs are currently the most widely-used. At the same time, they are expensive to fabricate, transport, entail labour intensive installation practices, and generally require increased trench depth and width dimensions in order that their installation can be properly accommodated. Current thinking in the relevant art is that even though these weights are very expensive, the protection they afford in terms of securely anchoring a pipeline more than offsets their associated materials and installation costs, once consideration is given to the repair and clean-up costs that could ensue in the event of any breech, or rupture, such as might otherwise be attributable to shifting of an unweighted, or improperly weighted pipeline emplacement.

Although such weights might be used in any number of situations, they appear most commonly in in-ground installations. In subterranean pipeline emplacements, the problem of pipeline leakage is, (from the point of view of precisely locating the problem, rapidly containing spillage and repairing any damage), most acute. Underground emplacements are also susceptible to hydrostatic forces, which can cause the pipeline to be displaced from the position it occupied when originally installed, possibly leading to such a rupture or breech. With this in mind, it will be readily appreciated that subterranean emplacements are quantitatively demanding, if not qualitatively exceptional from the point of view of pipeline weighting in such emplacements.

One proposed alternative for dealing with the problem of maintaining the positioning of a pipeline within a subterranean emplacement is disclosed in U.S. Pat. No. 3,170,663—Fite. This patent discloses an anchoring device for a pipeline, which incorporates an arcuate collar that is secured in straddling relation about the upper exterior surface of the pipeline. The collar is held in tensioned relation against that surface by a laterally spaced apart pair of anchoring rods having spiral flights thereon that extend beyond the under surface of the pipeline are adapted to positively engage the underlying soil substrate on either side thereof.

Another proposal entails the use, in muskeg environments, of simple two-dimensional sheets of a fabric that are intended to be deployed in a pipeline trench, overlaying the installed pipeline. Backfill is then layered over the fabric in the hope that the collected "unit weight" of the resulting overburden will be sufficient to counter any buoyant forces that local ground water might exert on the pipeline. Resort to this approach has been entertained only when alternatives are simply not available, (i.e. in remote muskeg areas). Moreover, there is a risk that ground water flows will displace some of the "unit weight" of the "disturbed" backfill from above the pipeline. This would be a particular problem in areas where ground surface contours or the grading of the emplacement or a non-level transit of the pipeline, might result in either or both surface and ground water flows that could be channelled within the fabric, almost in the manner of an artificial canal.

There remains a need in the art to reconcile the necessity of anchoring pipelines for the purpose of avoiding or reducing the impact of some of the problems set out above, with the apparently antithetical desire for any reduction in the high costs heretofore associated with the practices that the industry has been willing to embrace.

SUMMARY OF THE INVENTION

In accordance with one aspect of the present invention, there is provided a conduit weighting device comprising containment means adapted to supportingly receive therein a superposed charge of ballast material having an associated unit weight. The superposed ballast material is received in contained relation within an enclosure that is circumscribed on all sides by upwardly extending walls of the containment means. These walls are adapted to retainingly confine the ballast charge between them. The containment means is adapted to be positioned in saddling, superposed relation over a conduit of one description or another, to thereby at least partly counter displacement forces that might otherwise effect the positioning of the conduit.

The confinement of the ballast in the manner provided for in accordance with the above, is important to the reliability of the present device. Were the ballast otherwise unconstrained in any material way, then sloping or a wash-out of a loose ballast, might seriously erode any margin of safety that had been contemplated in the unit-weight design parameters associated with an emplacement. Clearly, such a possibility would not be even remotely acceptable to an industry which has historically gone to great lengths and expense to ensure against risks of that type.

The present invention finds application, inter alia, in connection with subterranean emplacements. In such environments buoyant hydrostatic forces might tend to "float" a trench-installed conduit, notwithstanding any countervailing influence of backfill overburden. In addition, the current of any hydraulic flows associated with the local ground water, might also encourage the conduit to be displaced from its intended location.

Preferably the walls are particularly adapted with a view to providing substantial isolation of the ballast charge from external hydraulic flows. This is particularly significant in situations were any substantial proportion of the unit weight of the ballast comprises other than coarse mineral materials. Finer materials otherwise might be carried off under the influence of any significant hydraulic flows, thereby diminishing the unit weight of the ballast, and opening the door to the possibility that a ground water buoyant effect might exceed the ability of the remaining ballast to resist the anticipated conduit displacement forces.

Moreover, when unconsolidated material is relied upon to secure a conduit emplacement, the unit weight which actually acts to secure the conduit in place is limited primarily to the mass of the vertical overburden and the mechanical shear characteristics thereof. Accordingly, in situations of the type wherein a vertical overburden, such as trench backfill for example, is relied upon to hold the conduit in position, a certain minimum height of overburden, (typically specified in the art as a "unit weight" parameter of any particular overburden material), is required to deal with any anticipated displacement forces. In accordance with the present invention, however, the unit weight of an enclosed but otherwise unconsolidated ballast material can be made to bear on the conduit in resisting displacement thereof, without necessarily having the ballast material arranged vertically above the conduit. The emplacement in such situations, therefore need not necessarily be as deep when the present invention is employed.

While the present invention is not necessarily constrained in its application to any particular type of conduit, it is nevertheless especially valuable in connection with pipelines, and in particular with petroleum, petrochemical, or other chemical pipelines.

In accordance with an especially preferred form of the present invention, at least the walls of the containment means are formed from a flexible material. Related advantages ensue to an even greater degree in embodiments of this aspect of the invention, wherein the entirety of the containment means is formed from such a flexible material.

More particularly, advantages related to this aspect of the present invention include the fact that such embodiments are relatively inexpensive to manufacture, yet can be produced from suitably durable materials. Naturally, the selected material should stand up well to subterranean conditions associated with in-ground pipeline emplacements, and other environmental effects to which any other particular application might lead them to be exposed. While any number of appropriately environment-stable materials will undoubtedly occur to the person skilled in the relevant art, examples of such include heavy gauge polymer products such as, by way of example only, polypropylene, polyester or nylon fabrics. Moreover, the resulting devices tend to be both lightweight and compact. They can be mass-produced, and stored without consuming undue amounts of storage space, and the production lead time required for making them available in commercial quantity is relatively short, thereby easing a logistical constraint that heretofore has always been a concern in organizing pipeline laying and repair projects.

Not the least of the advantages of such a flexible device lay in the fact that it can be made from a unitary fabric web adapted to be formed into containment means, wherein portions of the web correspond to respective wall portions adapted to be mutually secured in enclosure defining relation. Upon erection the assembled web forms the containment means whose plurality of walls in turn define an enclosure for receiving ballast material in the manner already elaborated upon herein.

Where stitching is utilized in the construction, a predetermination of the anticipated loading to which the stitched seams will be exposed should be undertaken. This is well within the extant skill in the present and related arts, having regard, generally, for the teachings herein contained.

Various pieces of hardware may be usefully employed in combination with the present invention, to facilitate filling, and/of handling of the device according to the present invention. Grommets, for example, can be advantageously employed in a manner such as that set forth in greater detail elsewhere herein.

Use of flexible materials in accordance with the practice of one general aspect of the present invention allows for the weight of the contained ballast, in a quantum predetermined by buoyancy offsetting design criteria, to be borne other than by the top of the pipe. The mass of material in the side portions of the containment means (as might by analogy be referred to as "saddle bag" portions), need only be exerted on the top of the pipeline in response to buoyant displacement forces. In this sense, the present system is dynamically responsive to the amount of buoyancy the water exerts. In the absence of buoyant displacement forces, the pipeline only need bear the unit weight of the vertically immediate overburden. Moreover, and perhaps even more importantly, the flexibility of the containment means allows for installation to be less exacting a procedure than it might otherwise have been when the prior art cast cement arches were employed. With the prior art cement arches, too high a placement could result in the pipeline being suspended in an unweighted condition beneath the casting. On the other hand pipeline damage could ensue if all of the castings weight were crushingly borne on the pipe line during installation.

The flexible character of the preferred embodiments of the present invention, render the containment means operably responsive to the application of extrinsic containment-means shaping forces, to conform the containment means to a desired external shape in response to how those forces are applied. With the present device situated in a pipeline emplacement, the walls flexibly conform with the supporting surfaces of the underlying or adjacent surfaces of the pipeline, primarily according to the dictates of gravitational forces acting on the ballast material contained within the device. Of even greater significance, however, is the fact that the devices polymorphic character can be selectively utilized to control the conformation of the device during the filling and installation operations. In an especially preferred form of this aspect of the present invention, control and lifting straps are used to effect and maintain a predetermined, general conformation during and following the introduction of ballast, to facilitate installation of the device within the emplacement. Once the lifting and control straps are relieved, with the device duly positioned within the emplacement, the device relaxes and takes up the above mentioned straddling relation over and around the adjacent pipeline surfaces. In accordance with the teachings of the present specification, it will be appreciated that these straps can be seen in retrospect, to have a functional similarity to the lines used by puppeteers to control their marionettes.

The straps may be fixedly attached to the containment means. In one alternative there might only be points of attachment on the containment means, each adapted to enable a contractor to removably secure some conformational control means (be it a strap or otherwise), to the containment means for the above described purposes. These, or for that matter any convenient functionally fungible device, can be used to facilitate the quintessential purpose thereof, namely controlled selective shaping and posturing of the containment means through the application of forces at selected points thereon.

Accordingly, there is provided a longitudinally-extending conduit weighting device comprising flexible-fabric, containment means. This containment means is adapted for supportingly receiving a superposed charge of ballast material, in contstrained relation within a lobate enclosure having containment means walls adapted to retainingly confine at least a portion of the charge within mutually adjacent lateral lobes defined by lobe-defining portions of the walls. The lobes are hingedly interconnected through an intermediate, longitudinally-extending flexible fabric portion of the containment means.

The containment means includes lobe-opening gromet means arranged in secured relation on the walls for lifting the containment means. Those lobe-opening gromet means are arranged in mutually laterally spaced apart relation along the containment means walls, on mutually opposite sides of the hingedly interconnecting flexible fabric portion, to be thereby operable to exert a lobe-seprating force across the hingedly interconnecting flexible fabric portion, in response to selective application of extrinsic lift forces at the lobe-opening gromets.

Upon such application of lifting force, the lobe-seperating force acts on the lobate enclosure in lobe seperating relation, to open up a conduit-accepting space between lobes. The containment means containing the ballast material is thereby operable to be positioned in straddling, superposed relation over a conduit, with the conduit being embraced in the conduit accepting space between the lobes, following relaxation of the extrinsic lifting forces. In a subteranean conduit emplacement, this containment means acts to at least partially counter bouyant displacement forces normally effecting the conduit therein.

In an especially preferred form the last above described device includes lobe-separtation constraint means, which are provided for controlling lobe-separation upon application of the extrinsic lifting forces at the lobe opening gromet means. In one embodiment the lobe-separation restraint comprises means for mutually securing the lobes in mutually adjacent relation. Such a means could comprise, for example, a lobe-interconnecting band.

In another form, the lobe-separation restraint comprises intermediate gromet means arranged intermediatly between the mutually opposed ones of the lobe-opening gromet means, with the intermediate gromet means being operable through selective application of relative proportions of lifting force on the lobe-opening and intermediate gromet means, respectively, to thereby liftingly control the opening up of the conduit-accepting space between lobes.

It will, of course, be appreciated that an internal or even external frame assembly could alternativley be used, for imparting a predetermined conformational structure to the flexible containment means contemplated herein. In accordance with one embodiment of this lattermost aspect of the present invention, there is provide a pre-fill form that is adapted to be secured to the containment bag, so that the ballast material is supported in a predetermined, arched relation.

DETAILED DESCRIPTION OF PREFERRED EMBODIMENTS

Introduction to the Drawings

Over the course of the description of the present invention that follows below, reference will be made to the appended drawings, in which.

Figure 11:
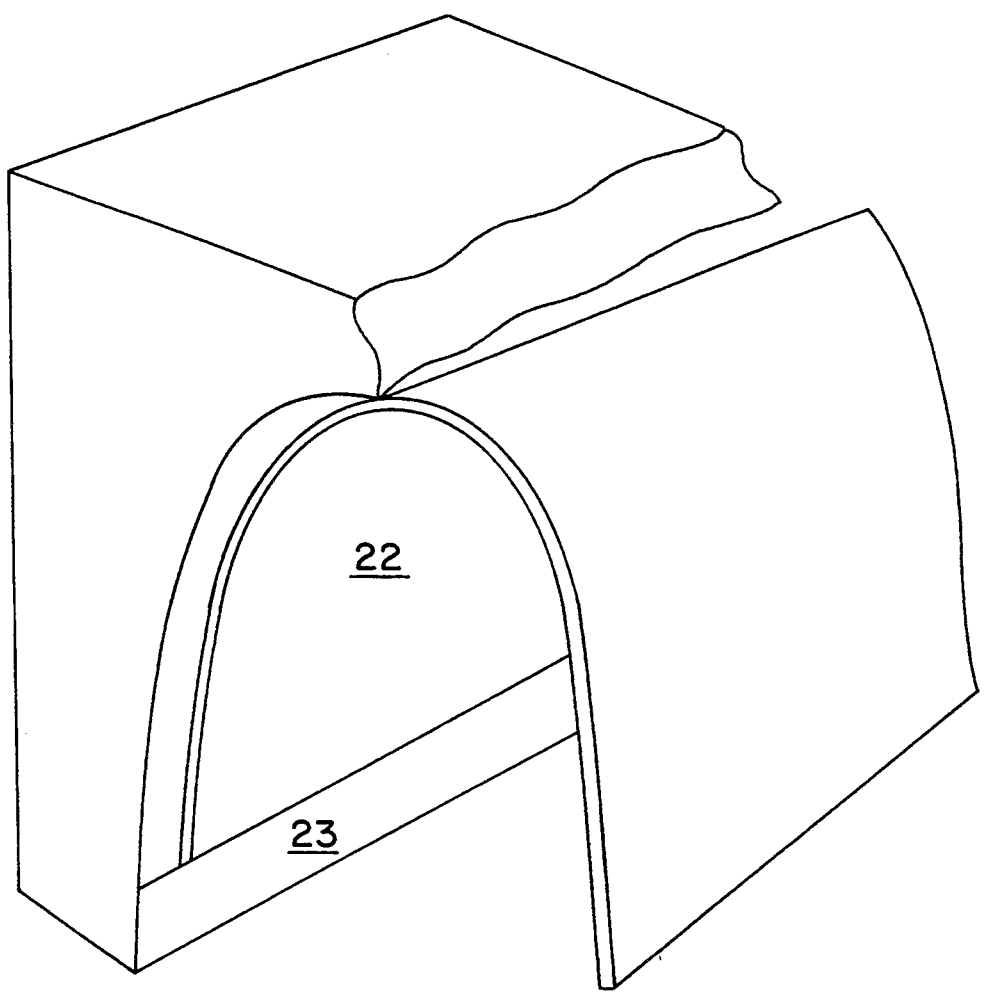

FIG. 11 of the drawings depicts another aspect of the invention—in particular, a arch support shown in situ, in a partially cut-away view of the fabric ballast containment bag.

Figure 2:
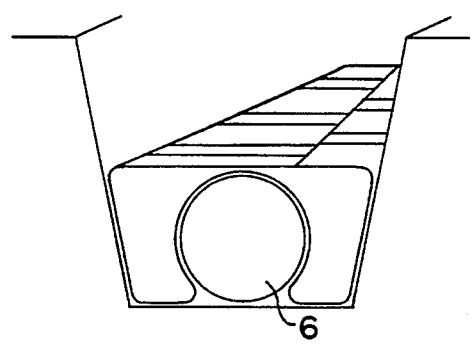
FIG. 2 is a comparable, transverse sectional view through a subterranean pipeline emplacement depicting the application of a device according to the present invention.
Figure 3:
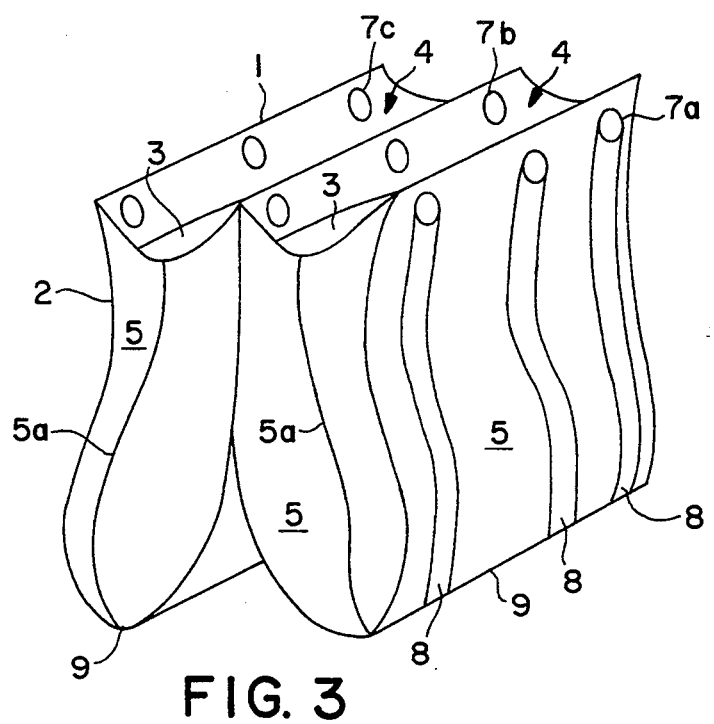
FIG. 3 depicts a preferred form of a device according to the present invention; and, FIG. 4 is a perspective view of a portion of the device depicted in FIG. 3.
Figure 4:
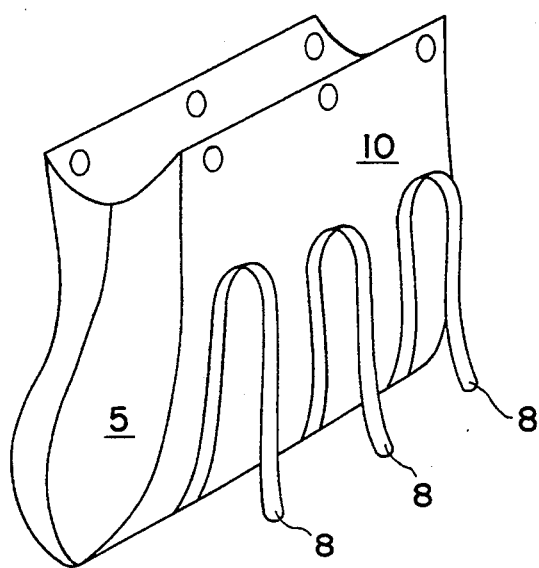

Referring now to FIGS. 2, 3 and 4 of the drawings, there is depicted a preferred embodiment of a conduit weighting device 1, according to the present invention, wherein a containment means 2 contains ballast material 3, within two "at least one" enclosures 4. Enclosures 4 are defined between respective, mutually interconnected walls 5, which are adapted to conform in a straddling relation over a pipeline 6, in a pipeline emplacement such as that illustrated in FIG. 2.

The depicted embodiment also includes attachment means 7, straps 8, and a folded-over and sewn lip 9.

More particularly, there is provided a containment means 2 comprising a pair of enclosures 4, each formed from respective ones of a unitary web of flexible, environmentally-stable plastic material. Portions of each of these webs correspond to respective wall portions in containment means 2, and are adapted to be, respectively, mutually secured in enclosure defining relation in the form of a plurality of interconnected walls 5. As illustrated, these respective wall portions are mutually secured along seams such as those marked with reference numeral 5a, to form the containment envelope that surrounds the corresponding enclosure 4. In addition, a folded over lip 9 is formed along the bottom of each of the envelopes.

The pair of enclosures 4 are mutually, hingably secured along contacting portions 10 of mutually adjacent walls 5. Stitching is used for this purpose. In addition, attachments means 7 in the form of press-fit, rust-resistant grommets, are employed to further secure the two contacting walls 5. Moreover, straps 8 are sewn along exterior surfaces of each of the enclosures 4, and extend between the enclosures 4 in bridging, mutually securing relation. In this way straps 8 reinforce the containment means 2 generally, and in particular, straddle the top of conduit 6 in an emplacement, to thereby help resist tensioned separation of the two enclosures 4. This strap arrangement is perhaps best illustrated in FIG. 4 of the drawings.

Note also that lifting the conduit weighting device 1, (relative to array 7b), by arrays 7a and 7c of attachment means grommets 7 on the respective mutually spaced apart walls 5, opens the separation between the respective bottoms of the two enclosures 4. Straps 8 reinforce walls 5, communicating the tension forces generated during such a lifting operation. On the whole, such a lift facilitates arrangement of device 1 in straddled relation over conduit 6, by conforming device 1 to permit better separation between the enclosures 4, around the upper surface of conduit 6.

Figure 1:
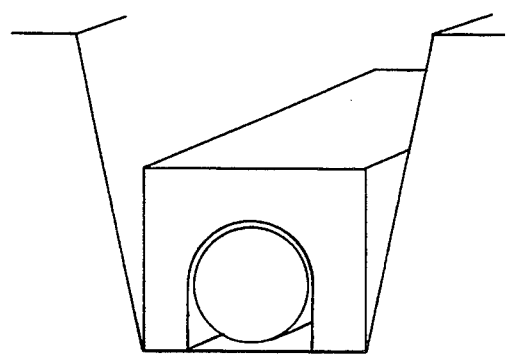
FIG. 1 is a transverse sectional view taken through a subterranean pipeline emplacement depicting the application of a pre-cast pipeline weighting device, typical of those employed in prior art pipeline emplacements.

Another advantage that can be accrued in accordance with the practice of aspects of the present invention are that the depth of the trench in an emplacement need not be as deep as is required to facilitate the use of prior art trench weights. Referring in that connection to FIGS. 1 and 2 of the drawings, note that the prior art structure illustrated in FIG. 1 occupies a substantial amount of headroom above the pipeline. This provides the necessary structural strength needed to facilitate the handling and longevity of the device. Unfortunately, the highest point of pipeline emplacements must in many cases be buried to a specified below-surface depth. If the highest point of the emplacement is the top of the prior art weight, then the pipeline itself must be buried correspondingly deeper. The device according to the present invention need not extend above the pipeline, as will be appreciated by skilled persons in light of the present disclosure. That being the case, the trench of the emplacement need not be as deep, with collateral savings in installation costs, and subsoil structure disruption. Moreover, this embodiment of the present invention is far less likely to visit damage to the pipeline during installation, than is the prior art device illustrated in FIG. 1.

Refering now to FIGS. 5 through 10 of the appended drawings, there is shown a longitudinally-extending conduit weighting device 11 comprising flexible-fabric, containment means 12 for supportingly receiving a superposed charge of ballast material 13, in contstrained relation within a lobate enclosure having containment means walls 14 adapted to retainingly confine at least a portion of said charge within mutually adjacent lateral lobes 15 defined by lobe-defining portions 16 of said walls, with said lobes 15 being hingedly interconnected through an intermediate, longitudinally-extending flexible fabric portion 17 of said containment means;

wherein said containment means includes lobe-opening gromet means 18 arranged in secured relation on said walls for lifting said containment means, wherein lobe-opening gromet means are arranged in mutually laterally spaced apart relation along said containment means walls, on mutually opposite sides of said hingedly interconnecting flexible fabric portion 17, to be thereby operable to exert a lobe-seprating force across said hingedly interconnecting flexible fabric portion, in response to selective application of extrinsic lift forces at said lobe-opening gromets, whereupon said lobe-seperating force acts on said lobate enclosure in lobe seperating relation, to open up a conduit-accepting space 18 between lobes;

whereby said containment means containing said ballast material is thereby operable to be positioned in straddling, superposed relation over a conduit 19, with said conduit being embraced in said conduit accepting space 18 between said lobes on relaxation of said extrinsic lifting forces; and, whereby, in a subteranean conduit emplacement, said containment means acts to at least partially counter bouyant displacement forces normally effecting said conduit therein.

In this embodiment, there are provided a plurality of reinforcing straps 20 running laterally along the bottom of the containment bag 12. Loose ends 21 are adapted to act as tie-downs, for holding the upper ends of the bag 12 closed. Velcro, buckles or other known means can be variously employed to this end, in conjunction with free ends 21.

Figure 5:
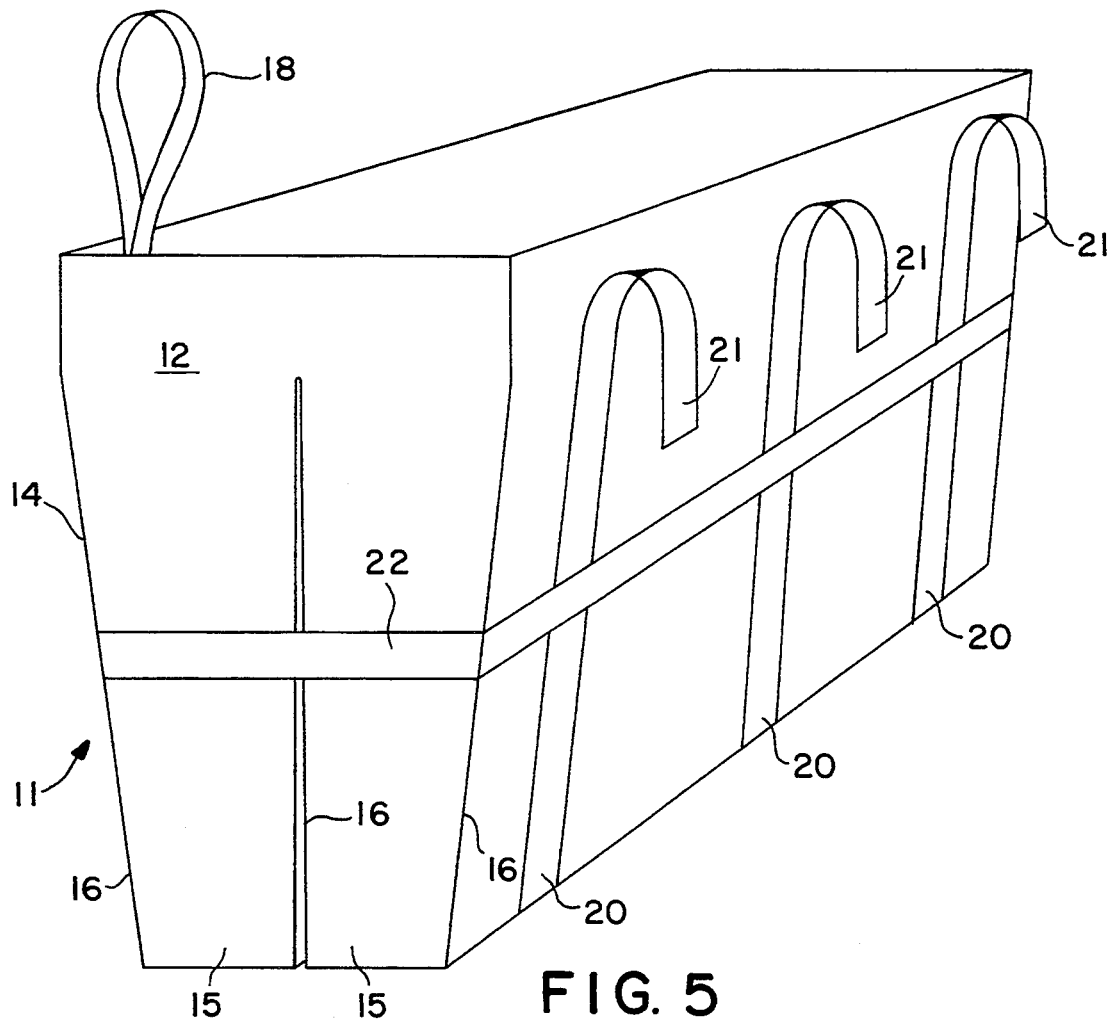
FIG. 5 is a perspective view of an alternative embodiment of the present invention.
Figure 6:
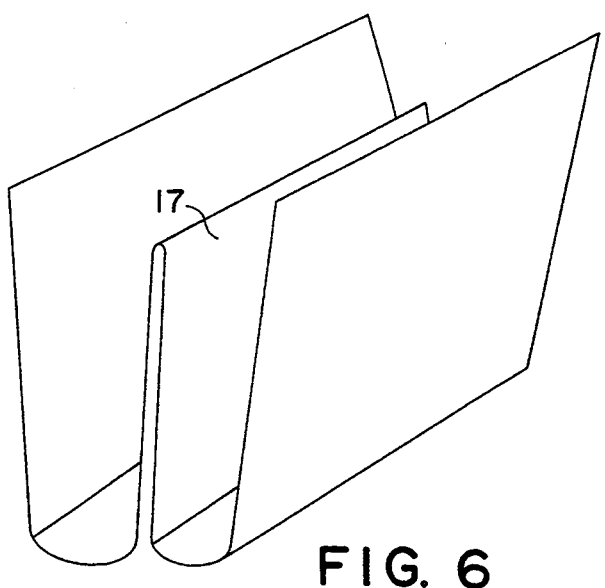
FIG. 6 depicts an early stage in the assembly of the embodiment illustrated in FIG. 5, to show certain aspects the internal construction thereof.
Figure 7:
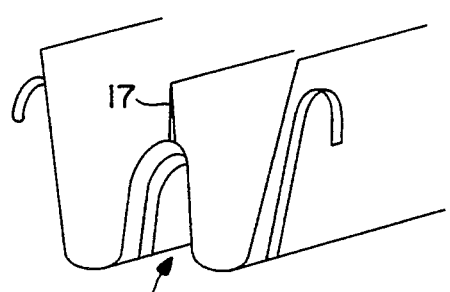
FIG. 7 illustrates another, more advanced step in the construction shown in FIGS. 5 and 6.
Figure 8:
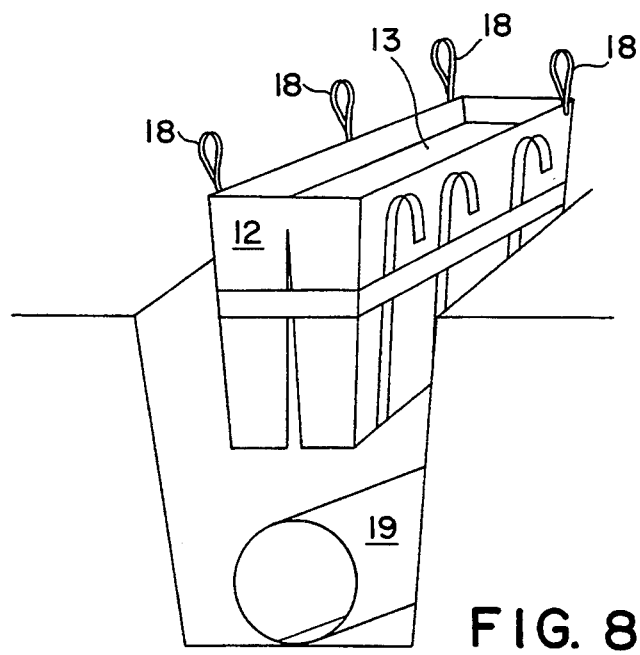
FIG. 8 illustrates a step in the installation of the embodiment shown in FIGS. 5, 6 and 7, into a subterranean pipeline emplacemnt.
Figure 9:
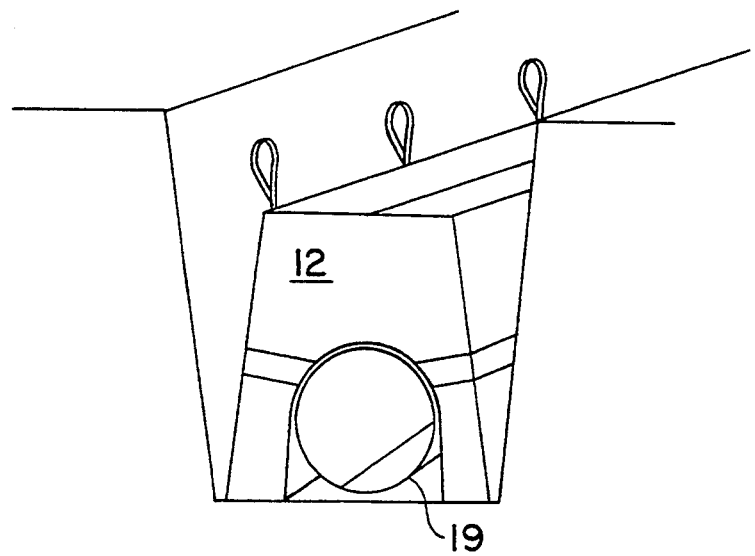
FIGS. 9 and 10 illustrate a subsequent, and final stage of the installation of the embodiment shown in FIGS. 5, 6 and 7, in the emplacement first illustrated in FIG. 8.
Figure 10:
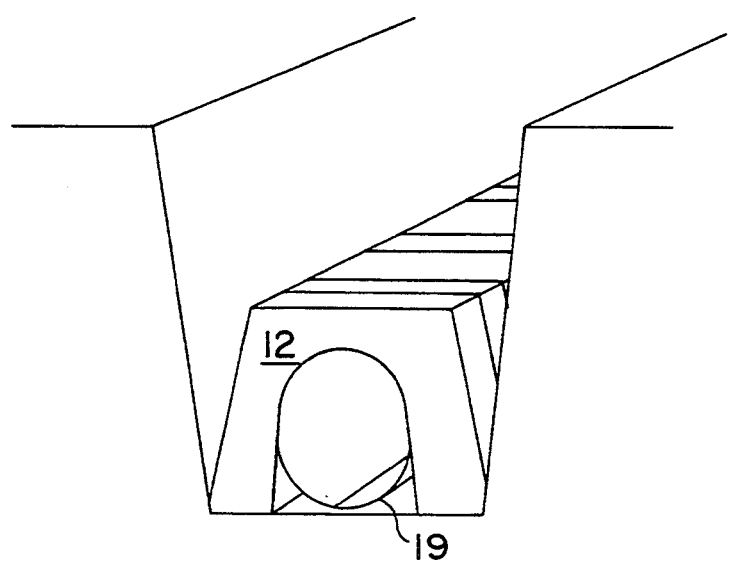

Reinforcing strap 22 serves to hold the lobes together as shown in FIG. 5, during filing of the device and insertion of the filled device in to a trench as is perhaps best visualized in FIG. 6. With the conduit weighting device positioioned immediately over the conduit 19, straps 22 are released (or severed) and lobes 15 separate form one another to open a space therebetween to accept conduit 19, (as shown in FIG. 9). Straps 21 are then folded across to close the open top device. These can be secured using any known means, including for example velcro.

Referring now to FIG. 11, there is shown a longitudinally-extending conduit weighting device comprising a flexible-fabric, containment bag for supportingly receiving a superposed charge of ballast material, in contstrained relation within a lobate enclosure having fabric containment bag walls adapted to retainingly confine at least a portion of that charge within downwardly depending, mutually laterally spaced apart lobes. These lobes are defined by lobe-defining portions of the walls, with the lobes being interconnected through an intermediate, longitudinally-extending flexible fabric portion of the containment bag.

In this embodiment, the containment bag further includes a rigid, structural lobe-separating arch support sheet 22 arranged in secured relation on the lobe-defining portions of the walls, between the lobes. This sheet 22 is used for maintaining the lobes in generally mutually spaced apart, conduit-accomodating relation. Sleeves 23 are formed in the walls to secrure the sheet thereto, prior to filling the bag with ballast material. The arch may be a preformed, rigid plastic sheet. Alternatively the sheet may comprise a resilient sheet material, that responds by deforming under loading of the lobes with ballast material, to assume the desired arch form.

Note that in general, and unless the context demands otherwise in the specific instance, the words "gromet means", "attachment means", and even simply "gromets" are used herein in referecne to not only gromets per se, but to include as well, such things as loops, hoops, bars, lugs, moorings, clamps or other forms of or for attachment, which serve a mechanically fungible purpose to the particluar gromets and/or hoops illustrated in connection with the various embodiments described herein.

I/We claim:

1. A longitudinally-extending conduit weighting device comprising top-loading, bifurcated envelope of flexible-fabric material, for receiving a charge of ballast material, in contained relation within a pair of mutually adjacent, downwardly-depending, lateral lobes having walls adapted to retainingly confine at least a portion of said charge within said lobes and wherein said lobes are hingedly interconnected through an intermediate, longitudinally-extending, flexible, bifurcation of said envelope; and,
   wherein said envelope includes envelope-lifting grommet means arranged along said bifurcation, wherein said envelope-lifting grommet means are operable to be engaged for lifting of said envelope; and,
   wherein said envelope includes lobe-separating grommet means arranged in secured relation on laterally spaced apart, outside ones of said walls with said outside ones of said walls being arranged on mutually opposite sides of said hingedly interconnecting bifurcation, in mutually laterally spaced relation thereto, and are operable to be engaged to selectively exert a lobe-separating force across said hingedly interconnecting bifurcation, in response to selective differential application of extrinsic lift forces at said lobe-separating grommets and said envelope-lilting grommets, respectively, whereupon said lobe-separating force acts across said envelope to open up a conduit-accepting space between lobes, and whereby said containment means containing said ballast material is thereby operable to be positioned in straddling, superposed relation over a conduit, with said conduit being embraced in said conduit accepting space between said lobes on relaxation of said extrinsic lifting forces; and,
   whereby, in a subterranean conduit emplacement, said containment means acts to at least partially counter buoyant displacement forces normally effecting said conduit therein.

2. The device according to claim 1 wherein said walls are adapted to substantially isolate said charge from hydrodynamic effects of ground water in sub-soil installations.

3. The device according to claim 1, wherein lobe-separation constraint means are provided for controlling lobe-separation upon application of said extrinsic lifting forces at said lobe opening grommet means.

4. The device according to claim 3 wherein said lobe-separation restraint comprises means for mutually securing said lobes in mutually adjacent relation.

5. The device according to claim 4, wherein said means for mutually securing said lobes, comprises a lobe-interconnecting band.

6. A longitudinally-extending conduit weighting device comprising, in combination:
   a flexible-fabric, containment means for supportingly receiving a superposed charge of ballast material, in contained relation within a lobate enclosure having fabric containment means walls adapted to retainingly confine at least a portion of said charge within downwardly depending, mutually laterally spaced apart lobes defined by lobe-defining portions of said walls, with said lobes being interconnected through an intermediate, longitudinally-extending flexible fabric portion of said containment means;
   wherein said containment means further includes a rigid, structural lobe-separating arch support sheet arranged in secured relation on said lobe-defining portions of said walls, said sheet forming a self-supporting arch between said lobes, for maintaining said lobes in generally mutually spaced apart, conduit-accommodating relation when said containment means is loaded with said ballast material;
   whereby, in a subterranean conduit emplacement, said containment means acts to at least partially counter buoyant displacement forces normally effecting a conduit positioned therein, in saddled relation between said lobes.

7. The device according to claim 6, wherein sleeve means are formed in said walls to secrure said sheet thereto.

8. The device according to claim 6, wherein said sheet comprises a resilient sheet material responsive to loading of the lobes with ballast by assuming an arch form.

9. The device according to claim 6 wherein said sheet is a generally rigid, preformed arch.

10. The device according to claim 9 wherein said sheet is a plastic sheet material.

11. A method for erecting a conduit emplacement, comprising the steps of:
   a) installing said conduit at said emplacement;
   b) filling a longitudinally-extending conduit weighting device comprising a top-loading, bifurcated envelope of flexible-fabric material, for with a charge of ballast material, in contained relation within a pair of mutually adjacent, downwardly-depending, lateral lobes having walls adapted to retainingly confine at least a portion of said charge within said lobes and wherein said lobes are hingedly interconnected through an intermediate, longitudinally-extending, flexible, bifurcation of said envelope; and,
   c) engaging lifting means to envelope-lifting grommet means arranged along said bifurcation, wherein said envelope-lifting grommet means are operable to be so engaged for lifting of said envelope; and,
   d) engaging lifting means to lobe-separating grommet means arranged in secured relation on laterally spaced apart, outside ones of said walls, with said outside ones of said walls being arranged on mutually opposite sides of said hingedly interconnecting bifurcation, in mutually laterally spaced relation thereto, and are operable to be so engaged to selectively exert a lobe-separating force across said hingedly interconnecting bifurcation, in response to selective differential application of extrinsic lift forces at said lobe-separating grommets and said envelope-lifting grommets, respectively, whereupon said lobe-separating force acts across said envelope to open up a conduit-accepting space between lobes, and whereby said containment means containing said ballast material is thereby operable to be positioned in straddling, superposed relation over a conduit, with said conduit being embraced in said conduit accepting space between said lobes on relaxation of said extrinsic lifting forces; and,
   e) lifting said envelope with said lifting means, and positioning same above said conduit; and, f) selectively applying lifting forces to said envelope-lifting grommet means and said lobe-separating grommet means, respectively to exert said lobe-separating force across said bifurcation, to thereby hingedly separate said lobes to form a conduit accepting space therebetween; and, g) lowering said containment means in straddling, superposed relation over said conduit; and, h) relaxing said extrinsic lifting forces, to there embrace said conduit between said lobes.

* * * * *